United States Patent [19]
Cathala et al.

[11] Patent Number: 5,115,405
[45] Date of Patent: May 19, 1992

[54] DEVICE FOR ADJUSTING THE BEARING FORCE OF A PANTOGRAPH ON A CATENARY WIRE AND PROCESS RELATING THERETO

[75] Inventors: Jacques Cathala, Balan-Mire; Pascale Forte, Tours, both of France

[73] Assignee: Faiveley Transport, St-Ouen Cedex, France

[21] Appl. No.: 513,486

[22] Filed: Apr. 19, 1990

[30] Foreign Application Priority Data

Apr. 28, 1989 [FR] France ................... 8905653

[51] Int. Cl.$^5$ .................................... B60L 5/16
[52] U.S. Cl. .................... 364/550; 191/60.3; 191/85; 191/90
[58] Field of Search .......... 191/41, 85, 86, 87, 191/90, 60.3; 364/550

[56] References Cited

U.S. PATENT DOCUMENTS

| | | | |
|---|---|---|---|
| 3,576,957 | 5/1971 | Tustin | 191/60.3 |
| 4,034,832 | 7/1977 | Lewis | 191/85 X |
| 4,301,899 | 11/1981 | McSparran et al. | 191/15 X |
| 4,572,950 | 2/1986 | Harmer | 250/227 |
| 4,618,764 | 10/1986 | Harmer | 250/227 |

FOREIGN PATENT DOCUMENTS

| | | |
|---|---|---|
| 0047819 | 3/1982 | European Pat. Off. |
| 1438818 | 2/1969 | Fed. Rep. of Germany |
| 2165813 | 7/1973 | Fed. Rep. of Germany |

*Primary Examiner*—Parshotam S. Lall
*Assistant Examiner*—Edward R. Cosimano
*Attorney, Agent, or Firm*—Young & Thompson

[57] ABSTRACT

A device (1) for adjusting the bearing force of a pantograph (30) of a railroad train set (10) on a catenary wire (2). The pantograph (30) has, at its upper end, a bow (3) in mechanical and electrical contact with the catenary wire (2), connected mechanically to an actuator (7, 34) exerting a nominal force on it at predetermined points and in a predetermined direction. A device (31) measures the contact force between the bow (3) of the pantograph (300 and the catenary wire (2) supplies information relating to the measured force. A transmitter (5, 4a) transmits the measurement information from the measuring device (31, 40) into an appropriate zone of the railroad train set (10). A processor (60, 20) processes the transmitted information and set-point range signals and supplies logical control signals. The actuator (6, 7) is controlled from the logical control signals when the measured contact force exceeds a predetermined maximum force threshold (Smax) or in responses to predetermined external control signals.

22 Claims, 3 Drawing Sheets

FIG_1

FIG_2

DEVICE FOR ADJUSTING THE BEARING FORCE OF A PANTOGRAPH ON A CATENARY WIRE AND PROCESS RELATING THERETO

FIELD OF THE INVENTION

The invention relates to a device for adjusting bearing force of a pantograph of a railroad train set on a catenary wire.

It likewise relates to the process used in the device according to the invention.

BACKGROUND OF THE INVENTION

Very high-speed railroad train sets travel along some lines equipped as conventional catenaries of variable height. The contact force of the pantographs of these train sets on the catenary wires changes considerably when strong gusts of wind disrupt the collection of the current. At the present time, the speed of the train sets is reduced in the event of a meteorological warning announcing these gusts of wind.

It is therefore expedient to have a device allowing the pantograph to be made less sensitive to transitory squalls by controlling the force exerted on it.

A possible solution to this problem would involve executing a closed-loop control of the bearing force of the pantograph on the catenary wire. The aim would then be to design an electromechanical actuator device controlled permanently according to well-known control techniques. The actuator member can be electrical, hydraulic or preferably pneumatic.

However, in the specific context of railroad train set equipment, a closed-loop control device has a number of disadvantages of which the following may be mentioned:

the need for permanent energy consumption to maintain the control in respect of a pneumatic actuator, this resulting in an appreciable consumption of air, possible problems of stability of the control and reliability of the elements of the closed loop, the relative complexity of such a device and a high cost.

OBJECT OF THE INVENTION

The object of the invention is to overcome these disadvantages by providing a device for adjusting the bearing force of a pantograph of a railroad train set on a catenary wire, said pantograph having, at its upper end, a bow in mechanical and electrical contact with the catenary wire and being connected mechanically to actuator means exerting a nominal force on it at predetermined points and in a predetermined direction. Such a device must have a lower energy consumption and increased reliability.

SUMMARY OF THE INVENTION

According to the invention, this device comprises:

means for measuring the contact force between the bow and the catenary wire and for supplying information, corresponding substantially to the measured force, said measuring means being located in the immediate vicinity of the bow, means for transmitting the measurement information from said measuring means into an appropriate zone of the railroad train set, information-processing means for processing the transmitted information and set-point range signals, comprising a maximum force threshold signal, and for supplying logical control signals, and control means for controlling said actuator means from said logical control signals when said measured contact force exceeds said maximum force threshold or in response to predetermined external control signals.

Thus, the device according to the invention makes it possible to achieve the abovementioned object of maintaining the bearing force of the pantograph within a predetermined force range, whilst at the same time making use of a simple open-loop system. There are available therefore a measurement, a comparison and a detection of a limiting contact force, the effect of these being a point control of the actuator means in the event of a deviation from the range of acceptable forces. Since the actuator means are controlled only if the set maximum threshold is crossed, this results in an energy saving and a great simplification of the control. Moreover, it is still possible to act directly on the actuator means, for example to raise and lower the pantograph, by means of external control signals.

According to a preferred version of the device according to the invention, the set-point range signals, processed by said information-processing means comprise, furthermore, a minimum force threshold signal, and said control means control said actuator means from said logical control signals when said measured contact force is below said minimum force threshold. This device thus ensures that the bow/catenary contact force remains above a minimum threshold, below which the risks of separation (misalignment) are considered excessive. The range of permissible contact forces is thus defined by both its upper limit and its lower limit.

According to another aspect of the invention, the process for adjusting the bearing force of a pantograph of a railroad train set on a catenary wire, used in the device according to the invention, the pantograph being connected to controlled actuator means exerting a nominal force on it at a predetermined point and in a predetermined direction, comprises, a step of measuring the contact force between the bow of the pantograph and the catenary wire, a step of comparing the measured force with a maximum contact-force threshold and of detecting the crossing of said maximum threshold, and a step of changing the force setting of said actuator means, carried out when the measured contact force exceeds said maximum force threshold.

With this process, it has become possible to adjust the bearing force of the pantograph by having an instantaneous contact-force measurement which is compared with a maximum threshold. The change of the force setting, namely the reduction of the force exerted by the actuator means in relation to the nominal force, is affected only in the event of a detection.

In an advantageous version of the invention, the process comprises, furthermore, a step of comparing the measured force with a minimum contact-force threshold and of detecting the crossing of said minimum threshold, and furthermore the force setting of said actuator means is changed when the measured contact force is below said minimum force threshold.

As a result of this nominal minimum force threshold value, the reliability of collection is further improved, the increase in the force exerted by the actuator means taking effect only in the event that the crossing of the minimum threshold is detected.

In a preferred embodiment of the invention, the actuator means comprise at least one pneumatic cushion exerting an adjustable force on the pantograph by mechanical connection means and connected to the control means by electrically insulating pneumatic supply means.

The pneumatic cushion used as an actuator of the pantograph is thus at the potential of the pantograph. Insulating pneumatic supply means are therefore provided to ensure electric insulation between the actuator and the control means located inside the railroad train set. The device according to the invention is highly suitable for use in pneumatic actuator systems. In fact, a pneumatic cushion subjected to a nominal air pressure will maintain a specific force on the pantograph permanently without any other action. In the event of a gust of wind and the detection of a contact force of the bow outside the acceptable force range, the necessary reduction or increase of the force exerted on the pantograph will be obtained simply by bleeding or by supplying compressed air to the pneumatic cushion for a predetermined time.

In an advantageous version of the invention, the force-measuring means comprise a force sensor working by microcurvatures of optical fibers, which is mounted in the immediate vicinity of the contact strip of the bow, and the information-transmission means comprise a bundle of optical fibers connected, on the one hand, to the force sensor by connection means and, on the other hand, within the appropriate zone of the railroad train set, to the conditioning and filtering means comprising a unit for converting optical signals into electrical signals and a unit for filtering the converted signals.

The use of optical fibers in the force-regulating device according to the invention has the major advantage over any other system that it ensures perfect electrical insulation between the elements of the pantograph under high voltage and the control units located inside the railroad train set. Moreover, this type of optical-fiber sensor has very high sensitivity, a small overall size and a negligible mass in relation to that of the bow, this constituting a positive factor in view of the importance of having a movable assembly of as low a mass and therefore inertia as possible, in order to improve the dynamic behavior of the latter.

Furthermore, it has been proved that transmissions by optical fiber have a very high level of immunity to noise and to interference.

BRIEF DESCRIPTION OF THE DRAWINGS

Other particular features and advantages of the invention will also emerge from the following description. In the accompanying drawings given by way of non-limiting example.

DETAILED DESCRIPTION OF THE INVENTION

Figure 1:
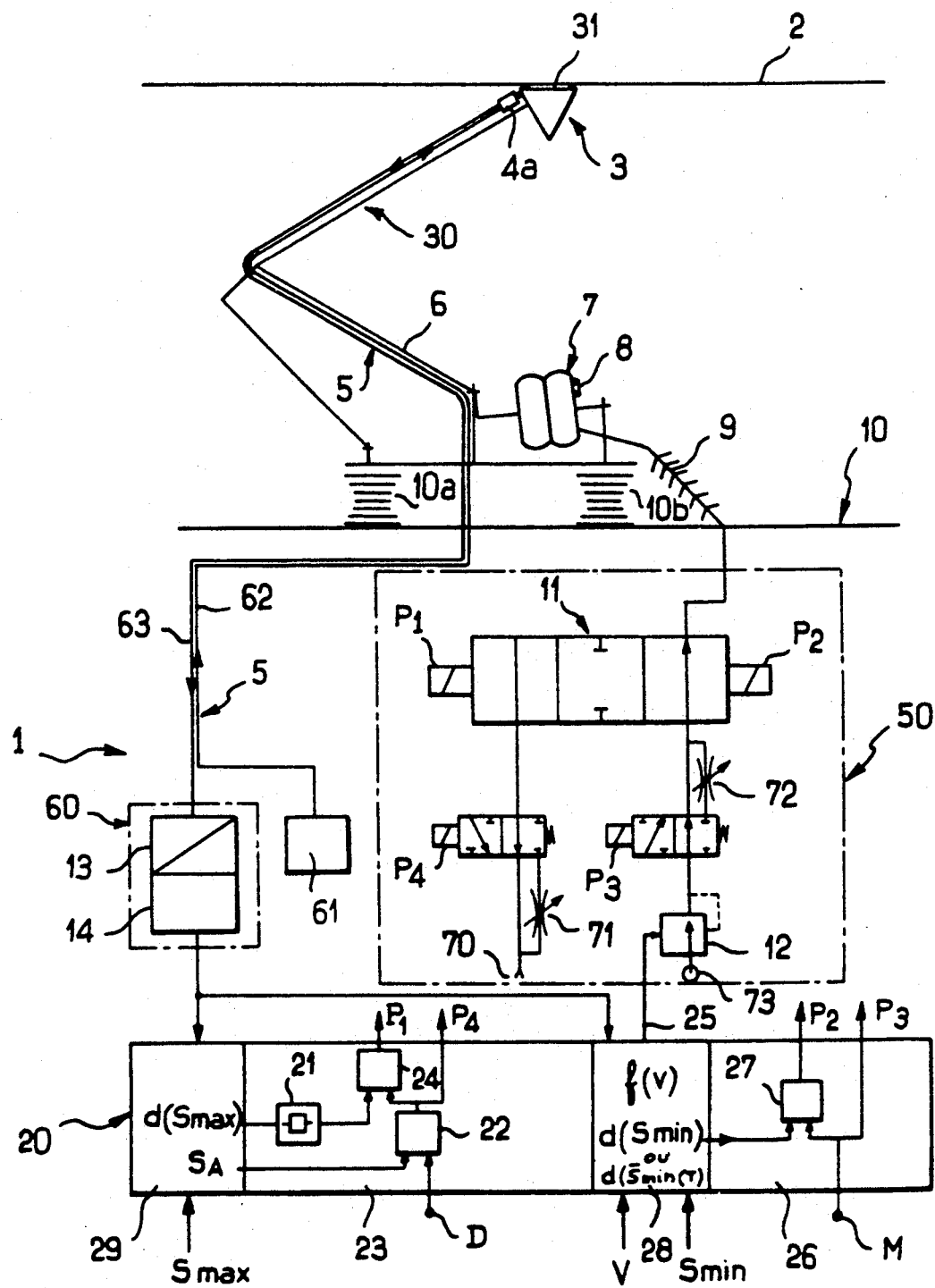
FIG. 1 is a general diagrammatic view of a force-regulating device according to the invention.

The device 1 according to the invention comprises, referring to FIG. 1, a force detection device 31 located on the bow 3 of the pantograph 30 of a locomotive or, more generally, of a railroad train set.

The function of this force detection device 31 is to detect/measure the contact force Fc between the bow 3 and the catenary wire 2. It preferably uses at least one force sensor working by the microcurvature of optical fibers, which will be described later, or any other force sensor making it possible to detect two contact-force thresholds.

The pantograph 30 is equipped with a pneumatic-cushion balancing actuator 7 or any other controllable active balancing device which acts by means of an arm 6 of tubular structure on the pantograph 30.

Insulators 10a, 10b ensure, according to a well-known technique, electrical insulation between the pantograph 30 under high voltage and the structure of the train set 10.

Figure 2:
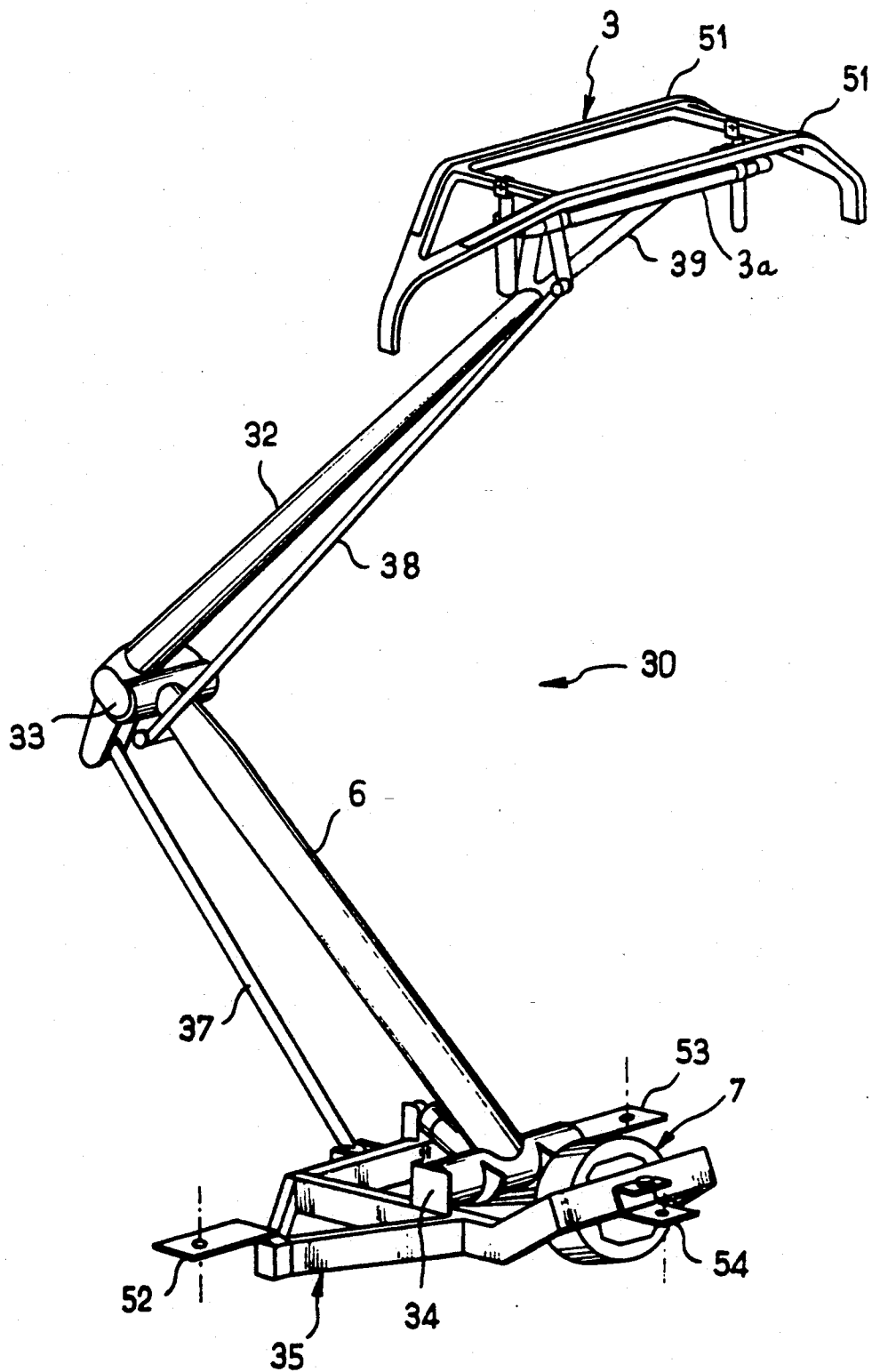
FIG. 2 is a simplified descriptive view of a pantograph which can be equipped with a regulating device according to the invention.

The pantograph 30, illustrated by way of example in FIG. 2, is of the single-arm type under a voltage of 25 kV. It comprises a bow 3 having a framework and friction strips 51 equipped with sensors. It also possesses a base structure 35 allowing the pantograph 30 to be mounted on the roof of a railroad train set by means of flanges 52, 53 and 54 and having the pneumatic actuator cushion 7 and a main joint 34. It also possesses an upper arm 32 of tubular structure and lower and upper parallelogram bars 37, 38. The lower and upper arms 6, 32 are connected by means of a second main joint 33, the upper arm being connected to the bow 3 by means of a connection piece 39 and an upper joint 3a.

The balancing of the pantograph 30 is ensured by the pneumatic cushion 7 which acts in a known way on the lower arm 6 by means of a cam/sling system (not shown).

The device 1 according to the invention furthermore possesses, referring to FIG. 1, a control system 50 for the pneumatic cushion 7, at least one bundle of optical fibers 5 for carrying the information coming from the force sensor 31 and ensuring electrical insulation, a signal-processing system 60 comprising a bidirectional optical converter 13 and a filter device 14, and an electronic control unit 20. The pneumatic control system 50, the signal-processing system 60 and the electronic control unit 20 are arranged on the locomotive equipped with the device according to the invention. The bundles of optical fibers 5 are preferably accommodated inside tubular pieces 6, 32 of the pantograph 30 and are thus protected against the wind and the weather. These bundles of optical fibers 5 make the connection between the force sensor 31 and the electronic control unit 20 via the signal-processing system 60, whilst an insulating pneumatic pipeline 9 supplies the air necessary for actuating the pneumatic cushion 7 which is at the potential of the pantograph 30. An optical connector 4a is provided for connecting the bundle 5 to the force sensor 31 located on the bow 3.

A light source 61 is provided in order to transmit a light signal to a first group of optical fibers 62 which carries the light signal towards the force sensor 31. A second group of optical fibers 63 ensures the return of the optical information representing the bow/catenary contact force Fc towards the converter 13. The combination of the two groups of optical fibers 62, 63 forms the abovementioned bundle of optical fibers 5.

The pneumatic control system 50 comprises a pneumatic solenoid valve 11 of the 3/1 closed-center type controlled by two solenoid valves P1, P2, themselves supplied with signals transmitted by the electronic control unit 20. The 3/1 solenoid valve 11 controls the pressure in the pneumatic cushion 7 equipped with a safety valve 8. The pneumatic control system 50 possesses, furthermore, two solenoid valves P3, P4 connected in parallel and respectively ensuring the phases of raising and lowering the pantograph 30, which are controlled by means of signals coming from the electronic control unit 20, and a regulator 12 controlled via an electrical connection 25 by means of a module 28 of the unit 20 and intended for ensuring, in a known way, a predetermined law of static force f(v) on the bow 3 as a function of the speed V of the locomotive, the regulator 12 being connected to a compressor (not shown) by means of an air supply 73. When the solenoid valve P3 is not being supplied, the air flows directly from the controlled regulator 12 towards the part of the 3/1 solenoid valve 11 controlled by the solenoid valve P2. Conversely, when the valve P3 is activated, the air flows between these same two portions of the pneumatic circuit 50, but via a first flow limiter 72.

Similarly, when the solenoid valve P4 is deactivated (or activated), the air flows directly (or via a second flow limiter 71) from the part of the 3/1 solenoid valve 11 controlled by the solenoid valve P1 towards a connection to the atmosphere or bleed, 70.

The electronic control unit 20 ensures, on the one hand, the logical processing of the information on the detection of the crossing of the predetermined thresholds, coming form the force sensor 31 and conditioned by the signal-processing system 60, and, on the other hand, the control of the four solenoid valves P1, P2, P3, P4 of the pneumatic control system 50 as a function of said detection information and nominal operating values. The electronic unit 20 comprises a module 29 for processing the maximum force threshold Smax, which can generate a detection signal d(Smax) when the force sensor 31 has measured a force higher than the nominal value Smax, and a fault signal $S_A$ when an absence of force-signal transmission (attributable, for example, to a failure of the senor or to a break of the bundle) occurs. The electronic control unit 20 also possesses a module 23 for the logical processing of the signals D(Smax) and $S_A$, the function of which is to generate control signals of the solenoid valves P1 and P4 and which also takes into account an external control D for the lowering of the pantograph 30. The module 23 will be designated hereafter as the lowering module.

The module 28 ensures the processing of the input signals: locomotive speed V, nominal minimum force threshold value Smin and the signal representing the force measured by the force sensor and preprocessed and shaped beforehand by the signal-processing system 60. This module 28 28 generates, in return, a control signal for the control regulator 12 and a signal for the detection of the minimum threshold d(Smin), the control signal of the regulator being in the abovementioned form of a predetermined law of static force f(v) as a function of the speed V of the locomotive. The signal representing the detection of the minimum threshold d(Smin) is applied to the input of a module 26 for the logical processing of the signal d(Smin) and a signal M demanding the raising of the pantograph 30, which, in return, generates two signals for the respective control of the solenoid valves P2 and P3 and which is designated hereafter as the raising module.

The lowering module 23 comprises a circuit 21 for generating a cutoff signal of predetermined duration from the detection d(Smax) of the crossing of the maximum force threshold (for example, a circuit of the monostable type), a first logical OR gate 22 having as inputs the fault signal $S_A$ and the external lowering control signal D, its output being connected, on the one hand, to the control line of the solenoid valve P4, and on the other hand, to one input of a second logical OR gate 24. The second input of this second logical gate 24 is the output of the abovementioned delay circuit 21, and it generates at its output the control signal of the solenoid valve P1.

The raising module 26 comprises a third logical OR gate 27 having as inputs the minimum threshold detection signal d(Smin) and the external raising control signal M and generating at its output the control signal of the solenoid valve P2, the solenoid valve P3 being controlled directly by the external raising control signal M.

The functioning of the limiting device according to the invention, at the same time as the process according to the invention, will now be described with reference to FIGS. 1 to 4.

Figure 3:
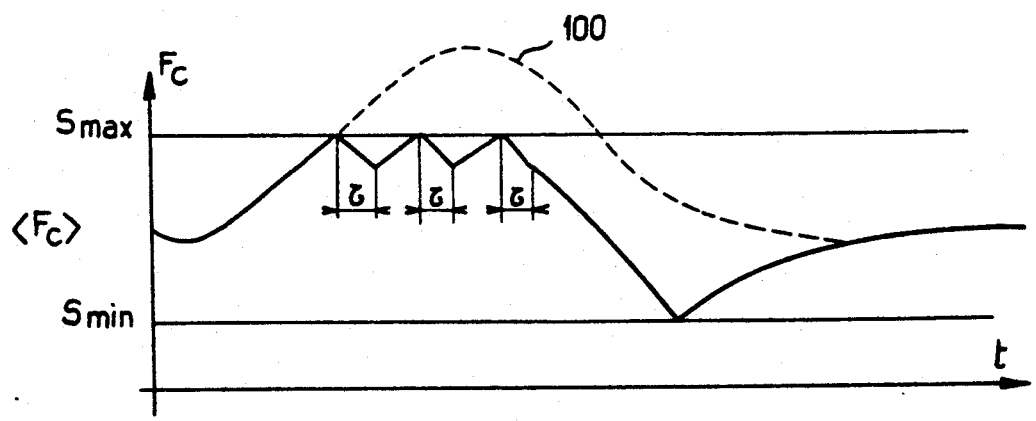
FIG. 3 is a diagram illustrating the change in the mean bow/catenary contact force as a function of time when the device of FIG. 1 is used, where a gust of high intensity is concerned.

When a strong gust of wind occurs in the region of the pantograph 30 and catenary wire 2, the contact force between the bow 3 and the catenary wire 2 increases considerably and, in the absence of a limiting device, can follow a trend, such as that shown by the curve 100 represented by broken lines in FIG. 3, where Fc denotes the contact force, the speed of the locomotive being assumed to be stabilized.

With the device according to the invention, the comparison made in the processing module 29 between the force measured by the force sensor and the nominal value Smax leads to a threshold detection and to a bleed of the pneumatic cushion 7 of a predetermined quantity of air for a predetermined time $\tau$. This bleed is repeated until the mean measured contact force <Fc> no longer reaches the threshold Smax. When the gust abates, the contact force <Fc> decreases until the minimum force threshold Smin is reached.

Figure 4:
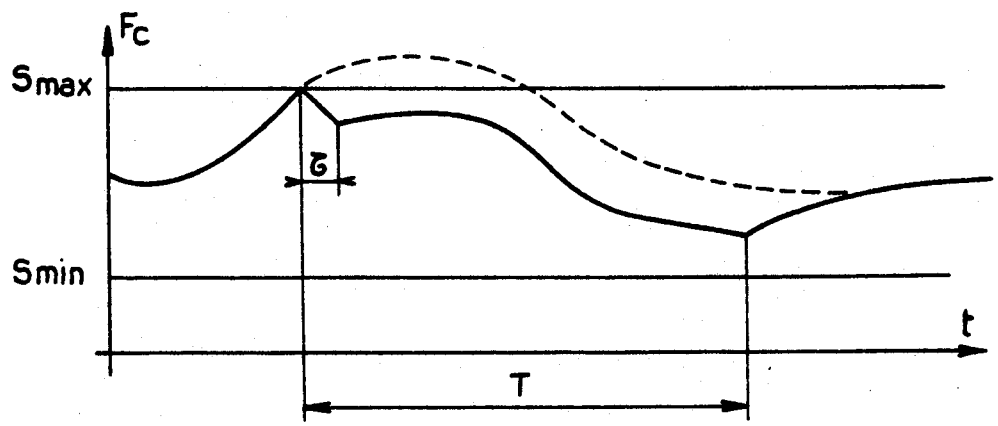
FIG. 4 is a diagram illustrating the change in the mean bow/catenary contact force as a function of time, where a gust of low intensity is concerned.

This detection brings about the control of the inflation solenoid valve P2 in order to increase and restore the nominal pressure of the pneumatic cushion 7 and obtain a mean contact force contained within the range [Smin, Smax].

Where a weak gust of wind is concerned, it is possible that the minimum threshold will not be detected, as is illustrated in FIG. 4. After the last bleed of predetermined time $\tau$, the measured contact force remains within the normal force range [Smin, Smax]. The nominal pressure is then restored systematically in the pneumatic cushion 7 after a predetermined waiting time T, this corresponding to the output signal of the module 28: d (S̄min(T) (see FIG. 1).

In contrast, if a gust of wind causes a substantial misalignment of the bow 3, the minimum threshold Smin is detected first. The pressure of the pneumatic cushion 7 is then increased in successive stages so as to maintain the contact force above Smin until the gust has disappeared. The cushion 7 is subsequently returned to its nominal pressure as soon as the maximum-force detection signal appears or if the time lapse T has expired since the appearance of the last signal d(Smax).

The nominal threshold values Smax and Smin are preadjustable as a function of the type of catenary and of specific characteristics of the pantograph so equipped. To ensure good current collection, under all circumstances Smin should not be below a minimum value, for example of the order of 4 to 5 daN, always ensuring contact between the bow 3 on the catenary wire 2.

The limiting device 1 according to the invention likewise ensures an automatic lowering of the pantograph 30 in the event of a breakdown of information coming from the force sensor 31, which may be attributable to a fault occurring on the collecting head or to an accidental break of the optical bundle 5, and the normal functions of raising and lowering the pantograph 30.

Thus, if an external raising control signal is applied to the input M of the electronic control unit 20, the solenoid valves P2 and P3 are activated and lead to the pressurization of the pneumatic cushion 7 and therefore to the raising of the pantograph at a controlled speed. If, in contrast, an external lowering control is applied to the input D, whatever the value of the fault signal $S_A$ the logical gate 22 will transmit a logical level 1 at its output and the solenoid valves P1 and P4 will be controlled, causing the complete bleeding of the pneumatic cushion 7 and therefore the lowering of the pantograph at a controlled speed.

The functioning of the pneumatic circuit 50 will be understood better from a reading of the three operating examples given below:

1) Raising of the pantograph

During the raising of the pantograph, the solenoid valves P3 and P2 are supplied as soon as the raising signal M appears. The air at the desired pressure, coming from the controlled regulator 12, passes through the first flow limiter 72. For an adjustable time, the pantograph rises at the desired speed under the action of the pneumatic cushion 7 and gently comes up against the catenary wire 2. The solenoid valve P3 then switches and the cushion 7 is fed at full flow. The flow limiter 72 and the solenoid valve P3 therefore adjust the raising time of the pantograph.

2) Lowering of the pantograph

During the lowering of the pantograph, the solenoid valves P1 and P4 are supplied. The pneumatic cushion 7 under pressure is bled 70 by means of the solenoid valve P1 and the bleed flow is controlled by the second flow limiter 71 which the solenoid valve P4 has caused to take action in the circuit. The bleeding time is adjusted in such a way that P4 changes its state once the pantograph has reached its lower limit stops.

3) Detection of the threshold Smax under collection conditions

The 3/1 solenoid valve 11 controlled by the two solenoid valves P2 and P3 makes the pneumatic connections given in Table I, where 1 (or 0) indicates that the corresponding solenoid valve is (or is not) supplied by the electronic control unit 20.

| State of P1 | State of P2 | Pneumatic connections |
| --- | --- | --- |
| 0 | 0 | Cushion 7 isolated |
| 0 | 1 | Air admission to the cushion 7 |
| 1 | 0 | Bleeding 70 |

It is assumed that the pantograph 30 is in the collection position, that is to say that the raising phase (see example 1) is concluded. The solenoid valve P3 is deactivated: there is therefore a full flow at the air admission. The pressure in the cushion 7 is regulated to the nominal value. When the maximum threshold d(Smax) is crossed, the electronic control 20 switches P2 to 0 and sends a pulse signal of predetermined duration $\tau$ to P1, the effect of which is to relieve the cushion of a quantity of air necessary and sufficient to reduce slightly the bow/catenary contact force. This cycle is repeated as long as d(Smax) is present. When d(Smax) has disappeared, the nominal pressure is reintroduced into the cushion 7 upon the appearance of d(Smin) or if d(Smin) does not occur during the waiting time T, counted from the last information d(Smax).

Furthermore, the control regulator 12 ensures a modulation of the static force as a function of the speed V of the locomotive according to the predetermined law $f(v)$.

In fact, the more the speed V increases, the more it is necessary to increase the major component of the contact force so as to ensure good collection, by making the dynamic phenomena relative.

Figure 5:
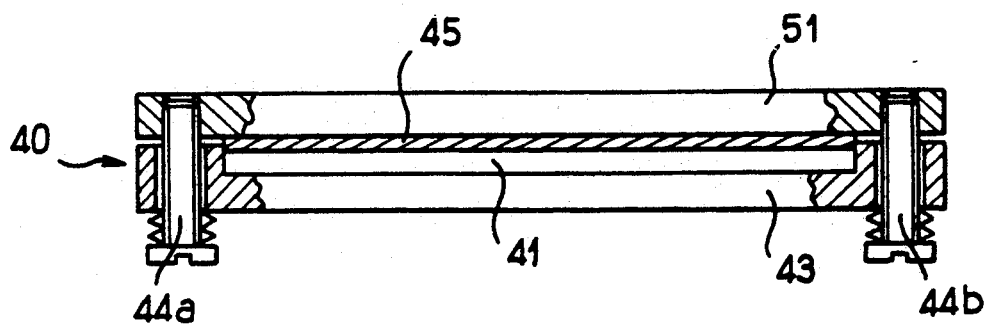
FIG. 5 is a diagrammatic view of an embodiment of an optical-fiber force sensor.

FIG. 5 illustrates diagrammatically an effective embodiment of the force sensor based on the generation of microcurvatures of optical fibers arranged between two surface causing their deformation.

U.S. Pat. Nos. 4,618,764 and 4,572,950 disclose optical-fiber pressure detectors of this type and their disclosure is incorporated herein by reference.

An analysis of the phenomena involved shows that, within a particular adjustable force range, the loss of light energy attributable to the microcurvatures is a linear function of the stress load.

The force sensor 40 comprises at least one optical fiber 41 retained between a framework 43 and a thermal insulator 45, itself adjacent to the strip 51 of the bow. Screws 44a, 44b ensure a prestressing of the optical fibers 41.

Of course, the invention is not limited to the examples described and illustrated, and many modifications can be made to these examples, without departing from the scope of the invention.

Thus, other types of force sensors are possible, for example piezoelectric or strain-gage sensors, provided that they solve the critical problems of electrical insulation.

Other types of actuators of the pantograph, for example electromechanical actuators, can thus be provided.

What is claimed is:

1. A device for adjusting the bearing force of a pantograph (30) of a railroad train set (10) on a catenary wire (2), said pantograph (30) having, at its upper end, a bow (3) in mechanical and electrical contact with the catenary wire (2) and being connected mechanically to actuator means (7, 34) exerting a nominal force on the wire (2) via the bow (3), which comprises:

means (31, 40) for measuring the contact force between the bow (3) and the catenary wire (2) and for supplying information, corresponding substantially to the measured force, said measuring means (31, 40) being located in the immediate vicinity of the bow (3), means (5, 4a) for transmitting the measurement information from said measuring means (31, 40) to the railroad train set (10), information-processing means (60, 20) for processing the transmitted information and set-point range signals, comprising a maximum force threshold signal (Smax), and for outputting logical control signals, and control means (50) for controlling said actuator means (7, 34) in response to said logical control signals when said measured contact force exceeds said maximum force threshold (Smax) or in response to predetermined external control signals.

2. A device (1)-as claimed in claim 1 wherein the force-measuring means comprise a force sensor (31, 40) working by microcurvatures of optical fibers, which is mounted in the immediate vicinity of at least one contact strip (51) of the bow (3), and wherein the information-transmission means comprise a bundle (5) of optical fibers connected, on the one hand, to the force sensor by connection means (4a) and, on the other hand, to a conditioning and filtering means (60) comprising a unit (13) for converting optical signals into electrical signals and a unit (14) for filtering the converted signals.

3. A device as claimed in claim 2, wherein the force sensor (40) comprises a layer of optical measuring fibers (41) inserted between a contact strip (51) and a framework (43) of the bow, a layer of thermal insulator (45) being arranged as an interface between the layer of optical fibers (41) and the contact strip (51), the assembly so formed being maintained under prestress by clamping means (44a, 44b).

4. A device as claimed in claim 1, wherein the set-point range signals processed by said information-processing means (60, 20) comprise, furthermore, a minimum force threshold signal (Smin) and wherein said control means (50) control said actuator means (7, 34) from said logical control signals when said measured contact force is below said minimum force threshold (Smin).

5. A device as claimed in claim 4, wherein the set-point range signals comprise first and second signals representing a threshold of contact forces corresponding respectively to a predetermined permissible maximum contact force (Smax) and to a predetermined permissible minimum contact force (Smin), and wherein said information-processing means (60, 20) comprise means (28, 29) for comparing the transmitted measurement information respectively with said minimum and maximum contact-force threshold signals (Smin, Smax).

6. A device as claimed in claim 5, wherein said set-point range signal comprise, furthermore, external control signals for the raising (M) and the lowering (D) of the pantograph (30).

7. A device as claimed in claim 6, wherein the actuator means (7, 34) comprise at least one pneumatic cushion (7) exerting an adjustable force on the pantograph (30) by mechanical connection means (6, 37, 31, 32, 33, 34) and connected to the control means (50) by electrically insulating pneumatic supply means (9).

8. A device as claimed in claim 7, wherein the control means (50) comprise means (11, P1, P2, P3, P4) for selectively supplying air to the pneumatic cushion (7) as a function of the control signals coming from the information-processing means (60, 20).

9. A device as claimed in claim 8, wherein the control means (50) comprise a closed-center pneumatic solenoid valve (11) equipped respectively with a bleeding solenoid valve (P1) and with an inflation solenoid valve (P2) and connected respectively to a controlled-speed lowering solenoid valve (P4) and to a controlled-speed raising solenoid valve (P3), each of said solenoid valves (P1, P2, P3, P4) being controlled respectively by a corresponding control signal coming from said information-processing means (60, 20).

10. A device as claimed in claim 8, wherein the control means (50) comprise, furthermore, a controlled regulator (12) feeding the solenoid valve (P3) and controlled by the information-processing means (60, 20) according to a predetermined law of control f(v) as a function of the speed (V) of the railroad train set (10).

11. A device as claimed in claim 10, wherein the information-processing means (60, 20) comprise means (60) for the conditioning and filtering of the signals coming from the transmission means (5) and from the electronic control means (20), comprising:

said comparison means (28, 29) which comprise means for supplying detection signals (d(Smin), d(Smax)), the maximum-threshold comparison means (29) comprising, furthermore, means for detecting from the transmitted information a fault situation in the region of the bow (3) and for supplying a fault signal ($S_A$) for the purpose of a systematic lowering of the pantograph (30), means (23) for controlling the lowering of the pantograph (30), and connected to the maximum-threshold comparison means (29), receiving the maximum-threshold detection signals (D(Smax)) and fault signals ($S_A$) and the external lowering control signal (D) and supplying the respective control signals of the bleeding solenoid valve (P1) and controlled-speed lowering solenoid valve (P4), and means (26) for controlling the raising of the pantograph (30) connected to the minimum-threshold comparison means, receiving the minimum-threshold detection signal (d(Smin)) and supplying the respective control signals of the inflation solenoid valve (P2) and controlled-speed raising solenoid valve (P3).

12. A device as claimed in claim 11, wherein the lowering control means (23) comprise means (21) for supplying a bleeding control signal of predetermined duration ($\tau$) from the minimum-threshold detection signal (d(Smin)).

13. A device as claimed in claim 12, wherein the lowering control means (23) comprise a first logical OR gate (22) with two inputs, to which the fault signal ($S_A$) and the external lowering control signal (D) are respectively applied, and a second logical OR gate (24) with two inputs, to which the bleeding control signal and the output of the first logical OR gate (24) are respectively applied, the respective outputs of the first and second logical gates (22, 24) supplying respectively the control signals of the controlled-speed lowering solenoid valve (P4) and the bleeding solenoid valve (P1).

14. A device as claimed in claim 13, wherein the raising control means (26) comprises a third logical OR gate (27) with two inputs, to which the minimum-threshold detection signal (d(Smin)) and the external raising control signal (M) are respectively applied, the output of the third logical OR gate (27) supplying the control signal of the inflation solenoid valve (P2) and the external raising control signal (M) directly controlling the controlled-speed raising solenoid valve (P3).

15. Process for adjusting the bearing force of a pantograph (30) of a railroad train set (10) exerted on a catenary wire (2) by a bow (3), the pantograph (30) being connected to controlled actuator means (7) exerting a nominal force on it at predetermined points and in a predetermined direction which comprises a step of measuring the contact force (Fc) between the bow (3) of the pantograph (30) and the catenary wire (2), a step of comparing the measured force (Fc) with a maximum contact-force threshold (Smax) and of detecting the crossing of said maximum threshold (Smax), and a step of changing the force setting of said actuator means (7), carried out when the measured contact force (Fc) exceeds said maximum force threshold (Smax).

16. A process as claimed in claim 15, which comprises, furthermore, respective steps of raising and lowering he pantogrpah (30) in response to respective external raising (M) and lowering (D) control signals.

17. A process as claimed in claim 16, which comprises, furthermore, a step of detecting a fault in the region of the bow (3), followed, in the event of actual detection, by the execution of a step of lowering the pantogrpah (30).

18. A process as claimed in claim 15, comprises, furthermore, a step of comparing the measured force (Fc) with a minimum contact-force threshold (Smin) and of detecting the crossing of said minimum threshold (Smin) and wherein, furthermore, the force setting of said actuator means (7) is changed when the measured contact force (Fc) is below said minimum force threshold (Smin).

19. A process as claimed in claim 18, wherein the changing step comprises, if the measured contact force is above the maximum force threshold (Smax), a step of reducing the force exerted by the actuator means (7, 34).

20. A process as claimed in claim 19, wherein the changing step comprises, if the measured contact force is below the minimum force threshold (Smin), a step of returning to the nominal force exerted by the actuator means (7).

21. A process as claimed in claim 20, wherein the step of changing the force is limited to a predetermined time ($\tau$).

22. A process as claimed in claim 21, wherein, if, after a predetermined waiting time (T) from the most recent detection of the crossing of the maximum threshold (Smax) or minimum threshold (Smin) respectively, no detection of the crossing of the minimum threshold (Smin) or maximum threshold (Smax) respectively has occurred, a step of returning to the nominal force exerted on the pantograph is executed.

* * * * *